United States Patent [19]

Hashimoto et al.

[11] Patent Number: 4,673,590

[45] Date of Patent: Jun. 16, 1987

[54] PROCESS FOR PREPARING A MAGNETIC RECORDING MEDIUM

[75] Inventors: Hiroshi Hashimoto; Tsutomu Okita; Noburo Hibino, all of Kanagawa, Japan

[73] Assignee: Fuji Photo Film Co., Ltd., Kanagawa, Japan

[21] Appl. No.: 833,680

[22] Filed: Feb. 25, 1986

Related U.S. Application Data

[63] Continuation of Ser. No. 690,903, Jan. 14, 1985, abandoned.

[30] Foreign Application Priority Data

Jan. 13, 1984 [JP] Japan .................................. 59-3584
Jan. 18, 1984 [JP] Japan .................................. 59-5674

[51] Int. Cl.$^4$ ............................................. H01F 10/02
[52] U.S. Cl. ..................................... 427/44; 427/54.1; 427/129; 427/130
[58] Field of Search ................ 427/129, 54.1, 44, 130

[56] References Cited

U.S. PATENT DOCUMENTS 4,247,580  1/1981  Chao .................................... 427/140
4,468,412  8/1984  Fujii et al. ............................. 427/38
4,468,436  8/1984  Okita et al. ........................ 428/423.3

Primary Examiner—Bernard D. Pianalto
Attorney, Agent, or Firm—Sughrue, Mion, Zinn, Macpeak & Seas

[57] ABSTRACT

A process for preparing a magnetic recording medium is disclosed, which comprises (1) subjecting a surface of a non-magnetic support having a surface roughness of not less than 0.01 μm to an abrasion treatment or a calendering treatment, (2) coating a layer containing a compound polymerizable by radiation exposure on the surface of non-magnetic support, (3) exposing the layer to radiation to polymerize and harden the same, and (4) providing a magnetic layer on the radiation exposed layer. The thus prepared magnetic recording medium is not accompanied by dropout due to "fish eyes" and is suitable for high density recording.

6 Claims, 2 Drawing Figures

FIG. 1
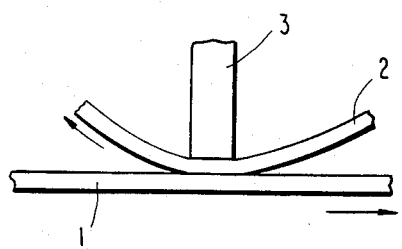
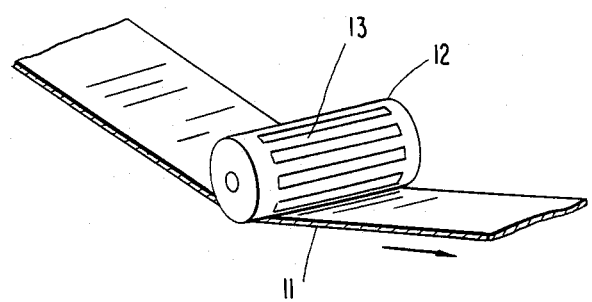
FIG. 2

PROCESS FOR PREPARING A MAGNETIC RECORDING MEDIUM

This is a continuation of application Ser. No. 690,903, filed Jan. 14, 1985, now abandoned.

FIELD OF THE INVENTION

The present invention relates to a process for preparing a magnetic recording medium, more particularly, to a process for preparing a magnetic recording medium suitable for high density recording.

BACKGROUND OF THE INVENTION

It has been desired in magnetic recording media for high density recording that the surface properties of the magnetic layer be improved to reduce spacing loss between the medium and a magnetic head. For this purpose, not only do the surface properties of the magnetic layer have to be improved by improving the manufacturing technology of the magnetic layer but also the surface properties of the support have to be improved. It has been attempted to make the thickness of the magnetic layer thinner in order to reduce thickness loss because the recording wavelength is lessened with increased recording density. As a result, the surface properties of the magnetic layer are more affected by the surface properties of the support.

However, the following reasons limit improvements in the surface properties of a support which is used for magnetic recording media. That is, as the surface properties of a film used as a support for a magnetic layer become better, frictional resistance to traveling rolls increased, and, as a result, in winding the film on the traveling rolls, the film meanders or is wrinkled. Further, the film or web cannot be uniformly wound because frictional resistance between opposite surfaces of the film to be wound increases.

Accordingly, it is preferred in the film manufacturing step that the surface of the film have a surface roughness not less than 0.01 μm, but it is required, to provide a magnetic layer having better surface properties suitable for high density recording on a film support, that the surface of film have a surface roughness less than 0.01 μm.

Various approaches have been proposed to overcome these inconsistent factors. For example, it is suggested in Japanese Patent Application (OPI) No. 109605/78 (the term "OPI" as used herein refers to a "published unexamined Japanese patent application") that a magnetic layer be coated on a support on which stilted fine particles of a thermoplastic resin have been provided and removed by dissolution with a solvent. However, according to this method, the characteristics necessary for magnetic recording media for high density recording cannot be attained.

To overcome the problems which have not been improved by conventional methods, the present inventors proposed in U.S. patent application Ser. No. 657,991, filed Oct. 5, 1984 that an intermediate layer containing a compound polymerizable by exposure to radiation such as electron beams or ultraviolet rays be coated on a non-magnetic support having a surface roughness not less than 0.007 μm be exposed to radiation to polymerize and harden the same, and then a magnetic layer is coated on the intermediate layer.

The above problems are overcome by such a magnetic recording medium. That is, surface properties are improved because the coated intermediate layer is leveled before it is hardened by radiation exposure, and, therefor, the surface properties of the magnetic layer which is coated on the intermediate layer after the intermediate layer is hardened are also improved. Accordingly, even if a support having a surface roughness not less than 0.01 μm is used, a magnetic recording medium having better surface properties which is useful for high density recording can be obtained.

The inventors continued to search for even more improved magnetic recording media and found that a magnetic recording medium having an intermediate layer exposed to radiation sometimes or often results in dropout due to the following reasons. That is, it is preferred, as described above, that the surface roughness (Ra) of film support be not less than 0.01 μm, but protrusions whose height is 0.2 μm or more (called "fish eyes") present on the film support cause dropout as the influence of such protrusions cannot be completely removed, even if a magnetic layer is provided after the intermediate layer is coated on the film support.

As a result of further research and development to remove the influence of the "fish eyes", the inventors found that to obtain a magnetic recording medium having improved surface properties which is not accompanied by the problem of "fish eyes" one can provide an intermediate layer on a support, which support has been subjected to an abrasion treatment or calendering treatment in advance, and then provide a magnetic layer on the intermediate layer.

SUMMARY OF THE INVENTION

A first object of the invention is to provide a process for preparing a magnetic recording medium using a non-magnetic support having a surface roughness of not less than 0.01 μm which is not accompanied by dropout due to "fish eyes".

A second object of the invention is to provide a process for preparing a magnetic recording medium having excellent surface properties which is suitable for high density recording (i.e., suitable for recording a signal having short wavelengths of, generally, less than 1 μm).

A third object of the invention is to provide a magnetic recording medium having an intermediate layer and a magnetic layer which are highly adhesive to a non-magnetic support.

BRIEF DESCRIPTION OF THE DRAWINGS

FIG. 1 is to illustrate one embodiment of abrasion treatments per this invention using an abrasive tape.

FIG. 2 is to illustrate another embodiment of abrasion treatments per this invention using a cylindrical rotating blade.

DETAILED DESCRIPTION OF THE INVENTION

The objects of the invention are attained by a process for preparing a magnetic recording medium which comprises subjecting a non-magnetic support having a surface roughness of not less than 0.01 μm to an abrasion treatment or a calendering treatment, providing a layer containing a compound polymerizable by radiation exposure on the surface of the support, exposing it to radiation, and then providing a magnetic layer on the layer.

It is possible to use a non-magnetic support having opposite surfaces of different surface roughness, but more sophisticated processing is needed to prepare such a support, and preparation efficiency is low. Per this invention, a non-magnetic support having opposite surfaces of substantially the same surface roughness is thus preferably used, but a support used in the invention is not limited to such a support.

The non-magnetic support used in the invention includes polyesters (e.g., polyethylene terephthalate or polyethylene-2,6-naphthalate), polyolefins (e.g., polyethylene or polypropylene), cellulose derivatives (e.g., cellulose triacetate, cellulose diacetate, cellulose acetate butyrate or cellulose acetate propionate), vinyl resins (e.g., polyvinyl chloride or polyvinylidene chloride), other plastics (e.g., polycarbonates, polyimides or polyimideamides), non-magnetic metals (e.g., aluminum, copper, tin, zinc, a non-magnetic alloy containing these metals or stainless steel), paper, baryta paper or paper coated or laminated with a polymer of $\alpha$-olefins having 2 to 10 carbon atoms (e.g., polyethylene, polypropylene or ethylene-butene copolymers), etc.

Surface roughness in this invention means a center line average roughness as defined in JIS-B 0601, paragraph 5, and the cut-off value is 0.25 mm.

The surface roughness of support used in the invention is not less than 0.01 $\mu$m, and preferably 0.015 to 0.5 $\mu$m.

On the back surface of support used in the invention, a back coating layer can be provided to improve running properties. In this case, the surface roughness of the back coating layer is preferably not less than 0.01 $\mu$m, more preferably not less than 0.015 $\mu$m, to achieve the preferred effects of the invention.

An abrasion treatment per this invention can be carried out using an abrasive tape (called a varnishing treatment) as disclosed in Japanese Patent Application (OPI) No. 196626/83, or using a rotating blade as disclosed in Japanese Patent Application (OPI) No. 196625/83.

FIGS. 1 and 2 are explanatory drawings showing embodiments of abrasion treatments per this invention.

In FIG. 1, showing the varnishing treatment, a surface of traveling support 1 is rubbed with an abrasive tape 2 traveling in a direction reverse that of the support and pressed thereagainst by head 3. The support 1 is preferably traveled at a velocity of 20 to 500 m/min and the abrasive tape 2 is preferably traveled at a velocity of 0.1 to 50 m/min in the reverse direction. The abrasive tape generally comprise a substrate (e.g., cloth, paper, etc.) having a uniform layer containing an abrasive (e.g., aluminum oxide, chromium oxide, titanium oxide, silicon oxide, silicon caroide, etc.) dispersed in a medium (oil and fats, wax, adhesive, solvent, surfactant, etc.). However, the abrasive tape is not particularly limited thereto and commercially available abrasive tapes can be used for the purpose.

In FIG. 2, a surface of the traveling support is rubber with a rotating cylinder 12 having many blades 13 on the surface thereof and rotating, preferably at a rotating rate of from 100 to 1,000 rpm, in the direction reverse that of the support which is preferably traveled at a velocity of from 20 to 50 m/min.

In either the varnishing treatment or the treatment with a rotating cylinder, the traveling support is rubbed with the abrasive tape or rotating cylinder at a pressure of 0 to 10 psi.

An abrasion treatment per this invention is carried out so that protrusions having a height of about 0.2 $\mu$m or more are removed and is not for smoothing the surface of the support but for removing "fish eyes". If abrasive dust from the "fish eyes" is high after the abrasion treatment, it is preferably removed by an air spray, suction, a cleaning tape, etc. The protrusions are generally measured by the stylus method according to JIS B0651.

The above described abrasion treatments are preferred embodiments of this invention, but the invention should not be limited to these embodiments because any abrasion treatment can be employed if it is suitable for removing "fish eyes".

A calendering treatment per this invention changes the unevenness of the support, particularly to remove "fish eyes" by treating the surface of the support with various calendering machines. For the calendering treatment, metal rolls, cotton rolls and synthetic resins (e.g., nylon or polyurethane) rolls can be employed. A super calendering using two rolls through which the support is passed is also useful. Useful calendering machines are disclosed in U.S. Pat. Nos. 2,688,567 and 4,100,326, and Japanese Patent Publication No. 37523/76.

The temperature of the calendering treatment is generally from normal temperature to the glass transition temperature (Tg) of the support to be treated, preferably 40° to 200° C. The pressure of the calendering treatment (i.e., the line pressure: the value of weight perpendicularly put on the axis of the calendering roll divided by the width of calendering roll) is not less than 5 kg/cm, preferably 40 to 600 kg/cm. The speed of calendering treatment is not more than 600 m/min, preferably 20 to 300 m/min.

On the surface of the support which is obtained by the abrasion treatment or calendering treatment, a layer containing a compound polymerizable by radiation exposure as an intermediate layer is coated.

The compound polymerizable by radiation exposure employed in the intermediate layer is a compound having at least one carbon-carbon unsaturated bond, preferably up to 10 carbon-carbon unsaturated bonds, in its molecule. Typical examples of the compounds are acrylates, acrylamides, methacrylates, methacrylamides, allyl compounds, vinyl ethers, vinyl esters, vinyl heterocyclic compounds, N-vinyl compounds, styrenes, crotonic acids, itaconic acids and olefins. More preferred compounds have 2 or more, preferably 2 to 4, acryloyl and/or methacryloyl groups per molecule, and include acrylates such as diethylene glycol diacrylate, triethylene glycol diacrylate, tetraethylene glycol diacrylate, trimethylolpropane triacrylate or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; and other esters of acrylic acids or methacrylic acids with polyols, having 2 or more, preferably up to 10, functional groups such as acryloyl group and methacryloyl group per molecule.

These compounds can be high molecular weight compounds, and preferably are compounds having an acrylic acid ester bond or a methacrylic acid ester bond in the ends of their molecular chain or in a side chain, which are disclosed in A. Vranckem, *Fatipec Congress*, 11, 19 (1972). An example of such compounds is represented by the formula:

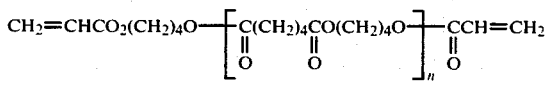

wherein $0 \leq n \leq 100$. In the formula, the polyester structure can be replaced by polyurethane structure, epoxy resin structure, polyether structure, polycarbonate structure or a mixture thereof. The molecular weight of the compound represented by the formula is 1,000 to 20,000, but it is not limited to such values.

The compounds polymerizable by radiation exposure can be used alone or in combination at any mixing ratio.

Further, thermoplastic resins generally having a molecular weight of 5,000 to 100,000, such as vinyl chloride-vinylidene chloride resins, urethane resins, acrylonitrile-butadiene resins, vinyl chloride-vinyl acetate resins, cellulose resins or acetal resins, can be used with the compound polymerizable by radiation exposure, if desired or necessary. The amount of thermoplastic resin is generally not more than 50% by weight, preferably not more than 30% by weight, based on the weight of the compound polymerizable by radiation exposure.

The radiation employed in this invention is electron beam or ultraviolet radiation.

Where ultraviolet radiation is used, it is preferred that a photopolymerization initiator be added to the compound polymerizable by radiation exposure. The photopolymerization initiator is not limited to specific examples, but initiators having a greater extinction coefficient at wavelengths of 254 nm, 313 nm and 365 nm, at which a bright line spectrum is generated by a mercury lamp conventionally used as a light source for ultraviolet radiation is preferably used.

Typical examples of initiators are aromatic ketones such as acetophenone, benzophenone, benzoinethyl ether, benzyldimethyl ketal, benzyldiethyl ketal, benzoin isobutyl ketone, hydroxydimethylphenyl ketone, 1-hydroxy-cyclohexyl phenyl ketone, 2,2-diethoxyacetophenone or Michler's ketone.

The amount of the photopolymerization initiator is generally 0.5 to 20 parts by weight, preferably 2 to 15 parts by weight, more preferably 3 to 10 parts by weight, based on 100 parts by weight of the compound polymerizable by radiation.

When the intermediate layer is coated on the support, various solvents can be used; however, if the compound polymerizable by radiation exposure is a liquid, no solvent need be present. As examples of the solvents, there are ketones such as acetone, methyl ethyl ketone, methyl isobutyl ketone or cyclohexanone; alcohols such as methyl alcohol, ethyl alcohol, propyl alcohol or butyl alcohol; esters such as methyl acetate, ethyl acetate, butyl acetate, ethyl lactate or glycol acetate monoethyl ether; glycol ethers such as ether, glycol dimethyl ether, glycol monoethyl ether or dioxane; aromatic hydrocarbons such as benzene, toluene or xylene; chlorinated hydrocarbons such as methylene chloride, ethylene chloride, carbon tetrachloride, chloroform, ethylene chlorohydrin or dichlorobenzene, etc.

The thickness of the intermediate layer (which is measured after it is polymerized and hardened by radiation exposure) is generally 0.1 to 2 μm and preferably 0.5 to 1.5 μm. The surface roughness of the intermediate layer is preferably less than 0.01 μm. To obtain the desired intermediate layer, it is effective that the viscosity of the coating composition for the intermediate layer be kept low, preferably within the range of from 1 to 1,000 cps, more preferably from 5 to 500 cps (25° C.), that is, a leveling effect is achieved by adding a low viscosity compound or an organic solvent to the composition.

For ultraviolet radiation, a high pressure mercury lamp having an output of about 80 w/cm is generally used. Upon the radiation it is preferred that the temperature of the support be kept below 100° C. so as to prevent thermal deformation of the support by, e.g., using an infrared filter or a cooling apparatus.

An electron beam accelerator is generally used for electron beam irradiation, e.g., a scanning method, a double scanning method or a curtain beam method can be used. Particularly, the curtain beam method is preferred because it provides large power at low cost. The acceleration voltage of the accelerator is 10 to 1,000 kv, preferably 50 to 300 kv, and the absorption amount of the electron beams is generally 0.5 to 20 Mrad, preferably 1 to 10 Mrad. When the acceleration voltage is not more than 10 kv, the amount of energy transmitted is insufficient, while when it is more than 1,000 kv, the energy efficiency for the polymerization is reduced and such is not economical. When the absorption amount is not more than 0.5 Mrad, the hardening reaction insufficiently proceeds while when it is more than 20 Mrad, the energy efficiency for hardening is reduced, materials exposed generate heat and plastic supports are deformed.

The magnetic layer(s) provided on the polymerization hardened layer of the invention can be composed of ferromagnetic particles and a binder as main components or composed of a ferromagnetic thin metal film.

The ferromagnetic thin metal film is generally prepared in a vacuum chamber or by plating a metal on the intermediate layer. The vacuum chamber is more preferred because the speed of forming the thin metal film is high, preparation steps are simple and no waste liquid treatment is needed. Methods for forming the thin films also include depositing a vapor of a substance or compound in a vacuum chamber or in a dilute gas on the intermediate layer, such as sputtering, ion plating or chemical gas plating.

Ferromagnetic metals for the magnetic thin film include, e.g., iron, cobalt, nickel or an alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, Co-Sm-Cu, etc.

The thickness of the magnetic metal film is generally 0.5 to 2 μm, preferably 0.1 to 0.4 μm.

Useful ferromagnetic powders, additives, organic solvents and methods for preparing magnetic recording media including dispersing methods and coating methods are disclosed in U.S. Pat. Nos. 4,135,016 and 4,205,353 and Japanese Patent Application (OPI) No. 46011/79.

In this invention, dropout due to "fish eyes" present on the surface of the support does not occur, surface properties are good and magnetic recording media suitable for high density recording are obtained by subjecting a non-magnetic support having a surface roughness of not less than 0.01 μm to an abrasion treatment or calendering treatment, coating a compound polymerizable by radiation exposure on the surface of the support to provide an intermediate layer, exposing the intermediate layer to radiation to polymerize and harden it, and then providing a magnetic layer on it.

The present invention will now be explained in more detail by the following Examples. In the Examples, "part" means "part by weight".

EXAMPLE 1

A surface of a polyethylene terephthalate film having a surface roughness of 0.01 μm and a thickness of 14.5 μm was subjected to an abrasion treatment by the following method.

As shown in FIG. 1, an abrasive sheet (trade name: "Imperial Lapping Film", produced by 3M, containing $Cr_2O_3$ particles having a particle size of 0.05 μm) was pressed on the film by means of an abrasive head, while the film was moved at a speed of 50 m/min and the abrasive sheet was moved in the direction reverse that of the film at a speed of 30 m/min. Ten abrasive heads were installed in the direction of film movement and the abrasive sheet and the film were contacted under the abrasive heads, and then a nonwoven cleaning cloth was pressed on the film to remove any abrasive dust, whereby the number of protrusions having a height of 0.5 μm or more on the film surface was decreased from 24 to 2 per 100 cm² of the film surface.

On the abraded film, diethylene glycol diacrylate was coated, and radiation exposure of an absorption amount of 5 Mrad was conducted at an acceleration voltage of 165 kv and a beam electric current of 5 mA. The thickness of the intermediate layer which was polymerized and hardened was 0.5 μm.

A magnetic coating composition having the following formula was kneaded for 10 hours.

|  | parts |
|---|---|
| Co—containing γ-$Fe_2O_3$ (Hc: 630 Oe; particle size: 0.4 × 0.05 × 0.05 μm) | 300 |
| Polyester polyurethane (ethylene adipate-2,4-tolylenediisocyanate reaction product; average molecular weight based on styrene: about 130,000) | 35 |
| Vinyl chloride-vinyl acetate-maleic anhydride copolymer (content of maleic acid: 3.0 wt %; polymerization degree: about 400) | 30 |
| Dimethyl polysiloxane (polymerization degree: about 60) | 2 |
| Butyl acetate | 300 |
| Methyl isobutyl ketone | 300 |

After dispersing the composition, 22 parts of a 75 wt% ethyl acetate solution of the trimethylolpropane adduct of triisocyanate compound (molecular weight: about 760, content of NCO: 13.3 wt%, trade name; "Desmodule L-75" manufactured by Bayer A.G.) was added, and the system was dispersed for 1 hour by high speed shearing to provide a magnetic coating composition. The thus prepared coating composition was coated in a dry thickness of 4 μm on the intermediate layer. The magnetic layer was subjected to orientation treatment under a direct current magnetic field and then dried with air heated to 100° C. After drying, the magnetic layer was calendered and slit to a ½ inch width to obtain Sample 1 for a magnetic video tape.

COMPARATIVE EXAMPLE 1

The same procedure as in Example 1 was repeated except that abrasion treatment of the support was not carried out to obtain Sample 2.

COMPARATIVE EXAMPLE 2

The same procedure as in Example 1 was repeated except that abrasion treatment was not carried out and the intermediate layer was not provided to obtain Sample 3.

EXAMPLE 2

The same procedure as in Example 1 was repeated except that a polyethylene terephthalate film having a surface roughness of 0.030 μm and a thickness of 14.5 μm was used to obtain Sample 4. By the abrasion treatment, the number of protrusions having a height of 0.5 μm or more on the film surface was decreased from 68 to 3 per 100 cm² of the film surface.

COMPARATIVE EXAMPLE 3

The same procedure as in Example 2 was repeated except that the polyethylene terephthalate film was not subjected to the abrasion treatment to obtain Sample 5.

COMPARATIVE EXAMPLE 4

The same procedure as in Example 2 was repeated except that the polyethylene terephthalate film was not subjected to the abrasion treatment and an intermediate layer was not provided on the film to obtain Sample 6.

C/N (3 MHz), video sensitivity and dropout of these Samples were measured as follows, and the results are shown in Table 1.

C/N: A 3 MHz carrier was recorded on Samples and reproduced, and the ratio of the reproduced carrier to noise (S/N ratio) was measured; it is shown as a relative value to Comparative Example 2.

Video sensitivity: The reproduced output at 4 MHz was measured by means of a VHS type (trade name "NV-8800" manufactured by Matsushita Electric Industries Co., Ltd.); it is shown as a relative value to the output in Comparative Example 2.

Dropout: A gray signal was recorded by means of VHS type VTR (trade name: "HR 3600" manufactured by Japan Victor Co., Ltd.) and reproduced. Dropout over 15 μsec.—18 dB was counted using a dropout counter manufactured by Japan Automatic Control Co., Ltd.

TABLE 1

| Sample No. | Surface Roughness of Intermediate Layer (Ra) (μm) | Abrasion Treatment | C/N (dB) | Video Sensitivity (dB) | Dropout (number/min) |
|---|---|---|---|---|---|
| 1 | 0.004 | Carried out | +0.5 | +1.1 | 5 |
| 2 | " | None | +0.4 | +1.0 | 29 |
| 3 | — | " | 0.0 | 0.0 | 32 |
| 4 | 0.006 | Carried out | +0.3 | +0.4 | 8 |
| 5 | 0.007 | None | −0.2 | +0.1 | 72 |
| 6 | — | " | −1.5 | −2.1 | 76 |

As is apparent from Table 1, magnetic recording media of this invention (Samples 1 and 4) which are obtained by providing an intermediate layer after the surface of support was subjected to an abrasion treatment are more excellent in C/N and video sensitivity, and generate less dropout then the Samples of the Comparative Examples.

EXAMPLE 3

A surface of a polyethylene terephthalate film having a surface roughness of 0.015 μm and a thickness of 14.5 μm was subjected to a calendering treatment by the following method.

The calendering treatment was carried out using a three-step calendering machine having two rolls, each of which had a chromium-plated surface having a surface roughness of 0.01 μm and one elastic roll having a 68 (RT) Shore hardness which was made of urethane rubber containing 22 wt% carbon at a speed of 30 m/min, a pressure of 40 kg/cm and a temperature of 60° C. On the calendered support, diethylene glycol diacrylate was coated and exposed to electron beams at a 5 Mrad absorption amount, an acceleration voltage of 100 kv and a beam electric current of 5 mA. The coating thickness of the intermediate layer after polymerized and hardened was 0.5 μm.

A magnetic coating composition as shown below was kneaded and dispersed for 10 hours by a ball mill.

|  | parts |
|---|---|
| Co—containing γ-$Fe_2O_3$ (Hc: 630 Oe; particle size: 0.4 × 0.05 × 0.05 μm) | 300 |
| Polyester polyurethane (ethylene adipate-2,4-tolylenediisocyanate reaction product; average molecular weight based on styrene: about 130,000) | 35 |
| Vinyl chloride-vinyl acetate-maleic anhydride copolymer (content of maleic acid: 3.0 wt %; polymerization degree: about 400) | 30 |
| Dimethyl polysiloxane (polymerization degree: about 60) | 2 |
| Butyl acetate | 300 |
| Methyl isobutyl ketone | 300 |

After dispersing the composition, 22 parts of a 75 wt% ethyl acetate solution of the trimethylolpropane adduct of a triisocyanate compound (molecular weight: about 760, NCO content: 13.3 wt%, trade name: "Desmodule L-75" manufactured by Bayer A.G.) was added and the system was dispersed for 1 hour by high speed shearing to provide a magnetic coating composition. The thus prepared coating composition was coated to a dry thickness of 4 μm on the intermediate layer. The magnetic layer was subjected to an orientation treatment under a direct current magnetic field, and was then dried with air heated to 100° C. After drying, the magnetic layer was calendered and slit into a ½ inch width to obtain Sample 7 for a magnetic video tape.

COMPARATIVE EXAMPLE 5

The same procedure as in Example 3 was repeated except that the calendering treatment was not carried out to obtain Sample 8.

COMPARATIVE EXAMPLE 6

The same procedure as in Example 3 was repeated except that the calendering treatment was not carried out and the intermediate layer was not provided to obtain Sample 9.

EXAMPLE 4

The same procedure as in Example 3 was repeated except that a polyethylene terephthalate film having a surface roughness of 0.030 μm and a thickness of 14.5 μm was used as a support to obtain Sample 10.

COMPARATIVE EXAMPLE 7

The same procedure as in Example 4 was repeated except that the calendering treatment was not carried out to obtain Sample 11.

COMPARATIVE EXAMPLE 8

The same procedure as in Example 4 was repeated except that the calendering treatment was not carried out and the intermediate layer was not provided to obtain Sample 12.

C/N (3 MHz), video sensitivity and dropout of these Samples were measured as earlier described and the results are shown in Table 2. C/N and video sensitivity are shown by relative values with respect to those in Comparative Example 6.

TABLE 2

| Sample No. | Surface Roughness of Intermediate Layer (Ra) (μm) | Calendering Treatment | C/N (dB) | Video Sensitivity (dB) | Dropout (number/min) |
|---|---|---|---|---|---|
| 7 | 0.004 | Carried out | +0.5 | +1.2 | 4 |
| 8 | " | None | +0.4 | +1.0 | 24 |
| 9 | — | " | 0.0 | 0.0 | 26 |
| 10 | 0.006 | Carried out | +0.3 | +0.2 | 6 |
| 11 | 0.007 | None | −0.2 | +0.1 | 76 |
| 12 | — | " | −1.5 | −2.1 | 82 |

As is apparent from Table 2, magnetic recording media of the invention (Samples 7 and 10) which are obtained by providing an intermediate layer after the surface of support has been subjected to a calendering treatment are more excellent in C/N and video sensitivity, and generate less dropout than the Samples of Comparative Examples.

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium having a non-magnetic support having a surface roughness of not less than 0.01 μm and which is not accompanied by dropout due to protrusions having a height of about 0.2 μm or more which comprises (1) subjecting a surface of a non-magnetic support having a surface roughness of not less than 0.01 μm to an abrasion treatment or a calendering treatment to remove said protrusions having a height of about 0.2 μm or more but retaining the surface roughness of not less than 0.01 μm, (2) coating a layer containing a compound polymerizable by radiation exposure on the surface of said non-magnetic support, (3) exposing the layer to radiation to polymerize and harden the same, and (4) providing a magnetic layer on the radiation exposed layer wherein said radiation exposed layer has a surface roughness of less than 0.01 μm and wherein said calendering treatment is carried out at a temperature of 40° to 200° C.

2. The process as claimed in claim 1, wherein said compound polymerizable by radiation exposure is a compound having at least one carbon-carbon unsaturated bond in its molecule.

3. The process as claimed in claim 2, wherein said compound polymerizable by radiation exposure is a compound having 2 or more acryloyl and/or methacryloyl groups in its molecule.

4. The process as claimed in claim 1, wherein the radiation is electron beam or ultraviolet radiation.

5. The process as claimed in claim 4, wherein the radiation is electron beam radiation.

6. The process as claimed in claim 1, wherein said calendering treatment is carried out at a pressure of 5 to 600 kg/cm.

* * * * *